United States Patent [19]

Wampetich

[11] 4,038,455

[45] July 26, 1977

[54] PROCESS FOR IMPROVING THE ADHESION OF POLY-1,3,4-OXADIAZOLE FILAMENTS TO RUBBER

[75] Inventor: Matthias Johann Wampetich, Chur, Crisons, Switzerland

[73] Assignee: Inventa AG fur Forschung und Patentverwertung, Zurich, Switzerland

[21] Appl. No.: 572,103

[22] Filed: Apr. 28, 1975

[30] Foreign Application Priority Data

May 13, 1974 Switzerland ............... 6477/74

[51] Int. Cl.$^2$ ............... C08G 33/04; C09J 3/12
[52] U.S. Cl. ............... 428/378; 156/110 A; 156/330; 264/184; 428/390; 428/414; 260/78.41; 260/830 R; 260/5
[58] Field of Search ............... 156/110 A, 330; 260/78.4 R, 830, 831, 836, 837, 78.41, 5; 427/381; 264/184; 428/378, 390, 414

[56] References Cited

U.S. PATENT DOCUMENTS

| | | | |
|---|---|---|---|
| 3,190,764 | 6/1965 | Cardina | 156/110 X |
| 3,297,468 | 1/1967 | Macara et al. | 156/110 X |
| 3,436,288 | 4/1969 | Patterson | 156/110 X |
| 3,537,932 | 11/1970 | Schrode | 156/110 X |
| 3,734,893 | 5/1973 | Stadinka et al. | 260/78.4 R |
| 3,775,382 | 11/1973 | Brydon | 260/78.4 R |
| 3,888,805 | 6/1975 | Van Gils et al. | 156/110 X |

OTHER PUBLICATIONS

*Adhesion Mechanisms,* Hannell; J. W., Apr. 1973.

*Primary Examiner*—Michael R. Lusignan
*Attorney, Agent, or Firm*—Bierman & Bierman

[57] ABSTRACT

A process for improving the adhesion to rubber of poly-1,3,4-oxadiozole filaments by applying compounds having at least one N-glycidyl group to the filaments. The products of the process and the use thereof in rubber articles are also disclosed.

17 Claims, No Drawings

PROCESS FOR IMPROVING THE ADHESION OF POLY-1,3,4-OXADIAZOLE FILAMENTS TO RUBBER

This application claims the priority of Swiss application 6477/74 filed May 13, 1974.

The present invention relates to a process for improving the adhesiveness to rubber of high-temperature resistant, aromatic poly-1,3,4-oxadiazole filaments and to the use of fibers, yarns, filaments and nonwoven, woven and knitted fabrics produced therefrom in rubber-coated materials and articles such as hollow bodies, hoses, driving belts, conveyor belts, tires, etc.

In the present invention, the term "high-temperature resistant, aromatic poly-1,3,4-oxadiazole filaments" refers to filaments of basically linear, aromatic poly-1,3,4-oxadiazoles of high molecular weight which have a high degree of orientation of the molecules along the filament axis and, due to a high melting and decomposition point of more than 325° C, are obtained, not by spinning from a polymer melt, but by spinning from polymer solutions.

Such filaments are obtained, for example, by reacting hydrazine or suitable inorganic hydrazine salts with aromatic dicarboxylic acids as well as functional derivatives of these acids. Suitable aromatic dicarboxylic acids are, for example, terephthalic acid, isophthalic acid, 5-methylisophthalic acid, 5-chloroisophthalic acid, 4-chloroisophthalic acid, tetrachloroterephthalic acid, naphthalene-1, 4-dicarboxylic acid, naphthalene-1-5-dicarboxylic acid, naphthalene-2,6-dicarboxylic acid, benzophenone-4,4'-dicarboxylic acid, terephthalophenone-4,4'-dicarboxylic acid, azobenzene-4,4'-dicarboxylic acid. The last material is satisfactory if the natural coloring associated therewith is not a problem. In general, however, colorless starting substances are preferred. In addition, functional derivatives of the foregoing, such as alkali salts, acid chlorides, amides and nitriles can be used. All these compounds may be used separately or as mixtures thereof. Particularly preferred as linear, aromatic poly-1,3,4-oxadiazoles of high molecular weight are those for which terephthalic acid, isophthalic acid or a mixture of terephthalic acid and isophthalic acid is employed as the aromatic dicarboxylic acid; that is, polyphenylene-1,3,4-oxadiazoles.

Because of their excellent mechanical, thermomechanical and chemical properties, fibers, filaments, yarns and fabrics made from linear aromatic poly-1,3,4-oxadiazoles of high molecular weight find use in rubber articles subjected to stress; such as, for example, driving belts, hoses, conveyor belts, tires, etc. The high heat resistance, strength values and mechanical moduli make them particularly useful in tires. Heretofore, these polymers have not realized their potential because their adhesion to rubber is even poorer than is the case with other synthetic polymeric substances.

The necessity for an additional treatment step has already arisen in the use of nylon, an aliphatic polyamide, but the problem has practically speaking, actually been solved by immersing the cord or cord fabric manufactured from nylon in a dipping bath. This so-called "dip" is carried out before incorporation in the rubber.

These dips are aqueous dispersions which contain mixtures of resorcinol-formaldehyde precondensates and latex (RFL dipping bath).

After the dip, the applied amount of RFL mixture is subsequently dried and thermally fixed. This is altogether usual in the case of nylon and is a part of the known art (Mechanics of Pneumatic Tires, NBS Monograph No. 122, page 274, 1971). A typical dipping bath of this kind consists of a dispersion of 428 parts by weight of Gentac Latex 41% (Manufacturers: General Tire and Rubber Company), 107 parts by weight of water and 465 parts by weight of 6.5% resorcinolformaldehyde solution. This is obtained by dissolving 0.3 parts by weight of sodium hydroxide, 11 parts by weight of resorcinol and 16.2 parts by weight of formalin solution (consisting of 37% formaldehyde in water) in 238.4 parts by weight of water at room temperature.

It has been found, however, that even with the application of this additional treatment step (which is completely satisfactory in the case of nylon filaments), satisfactory adhesion to rubber cannot be obtained with filaments produced from aromatic poly-1,3,4-oxadiazoles. It has been possible to pull aromatic poly-1,3,4-oxadiazole filaments out of the rubber even with the application of a very small force.

Clearly, this constitutes an extremely serious obstacle to the use of aromatic poly-1,3,4-oxadiazole filaments, fibers, yarns and fabrics in rubber articles subjected to stress, since the reinforcing action of these filaments cannot become effective for want of sufficient adhesion.

Surprisingly, it has been found that the adhesion of aromatic poly-1,3,4-oxadiazoles to rubber can be substantially increased, so that excellent adhesion to rubber is obtained by applying at least one N-glycidyl compound to the filament material.

Accordingly, the present invention relates to a process for improving the adhesion of high-temperature resistant, filaments of aromatic poly-1,3,4-oxadiazole by applying thereto an adhesion agent which comprises at least one N-glycidyl compound. After the application of the agent to the filaments, they may also be treated with a conventional RFL dipping bath, if necessary.

Basically suitable as N-glycidyl compounds are all nitrogen compounds which contain at least one

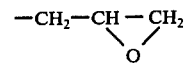

group bound to nitrogen. Such compounds can be derived, for example, from primary and secondary aliphatic, cycloaliphatic, araliphatic, aromatic and cyclic mono- and polyamines, as well as from amides, namely carbo- and sulfoamides and lactams, imides including urea, thiourea, guanidine, biuret, melamine, urethanes, etc.

Examples of suitable N-glycidyl compounds are:

N,N-bis-glycidyl butylamine,
N,N-bis-glycidyl cyclohexylamine,
N,N',N'-tetraglycidyl tetramethylenediamine,
N,N',N'-tetraglycidyl hexamethylenediamine
N,N',N'-tetraglycidyl-3-ethylamino-3,5,5-trimethylcyclohexylamine,
N,N,N'N'-tetraglycidyl-(1,3-bis-aminomethyl)benzene,
N,N',N'-tetraglycidyl-(1,4-bis-aminomethyl)benzene,
N,N-bis-glycidyl-aniline,
N,N-bis-glycidyl toluidine,
N,N-bis-glycidyl-p-chloroaniline,
N,N,O-triglycidyl-m-aminophenol,
N,N,O-triglycidyl-p-aminophenol,
N,N',N'-tetraglycidyl-m-phenylenediamine,
N,N',N'-tetraglycidyl-p-phenylenediamine, N,N,N',N'-tetraglycidyl-2,2-bis-(p-aminophenyl)-propane,
N,N,N',N'-tetraglycidyl-4,4'-diaminodiphenylmethane,
N,N,N',N'-tetraglycidyl benzidine,
N,N-bis-glycidylbenzoic acid amide,
N,N-bis-glycidyl benzenesulfonic acid amide,
N,N,N',N'-tetraglycidyl sulfanilic acid amide,
N,N,S-triglycidyl amino thiophenol,
N,N-bis-glycidyl acrylic acid amide,
N-glycidyl caprolactam,
N,N,N',N'-tetraglycidyl urea,
N,N,N',N'-tetraglycidyl thiourea,
N,N,N',N'-tetraglycidyl guanadine
N,N,N',N',N'',N'''-hexaglycidyl melamine,
N,N,O-triglycidyl aminoethanol,
N,N,O-triglycidyl aminopropanol,
N,O,O'-triglycidyl diethanolamine,
N,N-bis-glycidyl aminoacetic acid glycide ester,
N,N-bis-glycidyl-p-aminobenzoic acid glycide ester.

N,N,N',N'-tetraglycidyl arylenediamines, and in particular N,N,N',N'-tetraglycidyl-p-phenylenediamine, have so far proved to be the most effective N-glycidyl compounds for this purpose.

The preparation of N-glycidyl compounds has long been known. They are easily obtainable, for example by reaction of suitable compounds having at least one >N—H or —NH₂ group with an epihalohydrin followed by alkaline treatment (A.M. Paquin, Epoxydverbindungen und Epoxydharze [Epoxy Compounds and Epoxy Resins], Springer Verlag, Berlin, Gottingen, Heidelberg, page 367 et seq., 1958).

It is true that the use of N-glycidyl compounds for the improvement of the adhesion of polyester (particularly polyethylene terephthalate) fibers to rubber is already known (Swiss Patent 488,048). However, polyethylene terephthalate — which is linked in the main chain of the molecule by a

bond — is usually polymerized in the melt or solid phase at temperatures above 200° C and spun from a polymer melt at a temperature of more than 260° C; aromatic poly-1,3,4-oxadiazoles are polymerized in and spun from solutions.

It is all the more surprising that a substantial improvement in adhesion to rubber can be obtained by the application of N-glycidyl compounds to aromatic poly-1,3,4-oxadiazole filaments, since these filaments not only differ fundamentally from polyesters in the manner of polymerization and the method of producing the filaments, but also have a totally different chemical structure. Moreover, they are substantially different from polyesters in their thermal, mechanical, physical and physicochemical properties.

Whereas, for example, polyethylene terephthalate (a typical polyester) is rapidly decomposed in concentrated sulfuric acid and has a melting point below 270° C, aromatic poly-1,3,4-oxadiazoles are soluble in concentrated sulfuric acid, are not decomposed when so dissolved and have melting and decomposition points which are above 325° C and, as a rule, cannot be melted without decomposition.

The application of N-glycidyl compounds to filaments of aromatic polyphenylene-1,3,4-oxadiazoles can be performed very simply and does not require any additional cost. Liquid N-glycidyl compounds may be applied by means of an applicator roll or by simply drawing the filaments through a dipping tank. Of course, application may also be carried out by spraying the compound on or by any other suitable method of application. N-glycidyl compounds can be applied just as easily from solution, or from emulsions such as aqueous emulsions. The concentration of N-glycidyl compound is not critical and the amount applied may vary within wide limits. The concentration is advantageously so chosen that, with a single application, more than 0.001 and less than 10 per cent by weight of N-glycidyl compound is applied.

In order to facilitate further processing steps, it is frequently necessary to apply various modifying substances to the filaments to, for example, reduce the static charge, achieve better fiber cohesion or improve the friction characteristics. Another advantageous method of applying the N-glycidyl compound is by simultaneous application of the modifying substances and the adhesion agent. It is also possible, of course for consecutive application to take place. If desired, aids to solution or emulsifiers may, of course, be employed additionally (preferably with simultaneous addition) without disadvantages arising in the improvement of the adhesion to rubber.

The amount of N-glycidyl compounds applied is not at all critical and may be varied within wide limits without impairing the improved adhesion properties. If only 0.001 per cent by weight of N-glycidyl compound(s) (corresponding to 0.001 part by weight of N-glycidyl compound(s) to 100 parts by weight of filament) is applied, the effect is naturally relatively small. The amount applied may be up to several per cent by weight, the upper limit being determined primarily by economic considerations. Particularly preferred amounts of N-glycidyl compound(s) are 0.05 to 5 per cent by weight based on the filament.

Advantageously, the adhesion agent is dried and thermally fixed on the filament material. In a preferred embodiment, the application is effected before the hot afterstretching of the filaments, a treatment step which achieves substantial improvement in the mechanical properties of these fiber materials and is generally used in the present state of the art. In this way, an additional treatment step for drying the adhesion agent and fixing it becomes unnecessary, which once more simplifies the use of N-glycidyl compounds and makes it cheaper.

The application of an N-glycidyl compound for improving the adhesion to rubber does not have any undesirable effect on the other properties of the aromatic polyphenylene-1,3,4-oxadiazole filaments. They become neither rough nor inflexible, so that all further treatment steps such as twisting, cording, etc. can be carried out as usual.

The recognized U test (see Rubber Chemistry & Technology, Vol. 42, page 245, 1969) is applied to determine the adhesion between the embedded filaments and the rubber. The test is carried out by embedding the filament to be tested in a defined rubber test body. Measurement is effected by fixing the rubber body, whereupon a pull is exerted on the embedded filament, the value of the pull being measurable. The force which is necessary to pull the filament out of the rubber body is determined repeatedly and the average value from ten tests is calculated. The force determined in this way, divided by the area of contact between the rubber and the filament, serves as a measure of the adhesion between the rubber and the embedded filament.

The following Examples illustrate the invention without, however, limiting it in any way.

EXAMPLE 1

(Comparison example without N-glycidyl compound)

By means of a spinning apparatus, spinning is carried out under a pressure of 2.7 atmospheres into dimethylformamide at 30° C, through a spinneret having 400 holes each 0.120 mm in diameter. The spinning solution consists of 10 parts by weight of poly-p-phenylene-1,3,4-oxadiazole in 90 parts by weight of concentrated sulfuric acid. After passing through a 165 cm coagulation path, the yarn is conveyed into a hot water washing bath having a temperature of 80° C and a length of 215 cm and is stretched as usual at the same time. The yarn is wound on on bobbins, washed overnight in running water and dried at 70° C. To improve the mechanical properties, the yarn is subjected to a hot after-treatment by passing the filament through a heating duct flushed with nitrogen and having a length of 115 cm and an internal temperature of 430° C. The yarn is after-stretched at the same time by a factor of 1.71, resulting in a filament with a total size of 1000 den.

The filaments are formed in known manner into a cord twist and then passed through a bath consisting of an aqueous emulsion of resorcinol-formaldehyde resin and latex (RFL). The applied mixture is dried at 160° C and then fixed at 220° C. This treatment is carried out similarly to that which is conventionally employed with nylon. The cord twist treated in this way is vulcanized into a conventional rubber carcass composition consisting of ---
50 parts by weight of natural rubber
50 parts by weight of polybutadiene rubber (PBR)
4 parts by weight of zinc oxide
20 parts by weight of carbon black
1.5 parts by weight of phenyl-beta-naphthylamine
2.5 parts by weight of sulfur
0.7 parts by weight of VULCAFOR-HBS (product of Imperial Chemical Industries Ltd., London)

---

The force which is necessary at room temperature to pull the cord twist out of the rubber is thereupon measured by the aforementioned U test. The force per unit of area of contact between the rubber and the embedded cord twist serves as a measure of the adhesion between the latter and the rubber. This force is only 9.2 kg/cm².

EXAMPLE 2

The same procedure is followed as in Example 1 except that, prior to the hot after-treatment, 0.10 per cent by weight of N,N,N',N'-tetraglycidyl-p-phenylenediamine is applied to the filaments by passing them through a dipping tank. The U test value for adhesion to rubber is 49.4 kg/cm².

EXAMPLES 3 – 10

N-glycidyl compounds in accordance with the following Table are applied from an aqueous emulsion containing 2.5 per cent by weight to filaments having a thickness of 1200 den. and consisting of 850 individual filaments of poly-p-phenylene-1,3,4-oxadiazole. The amount of N-glycidyl compound applied is regulated by the speed of rotation of the applicator roll. The filaments are subjected to heat treatment at 250° C to dry the N-glycidyl compound, after which a cord twist is produced in the usual manner. As in Example 1, this twist is run through an RFL dipping bath, the RFL mixture applied to the twist being dried at 155° C and fixed at 225° C. The procedure is otherwise the same as in Example 1.

The adhesion values obtained, determined as in Example 1 by the U test, are contained in the following Table:

| Example | N-glycidyl compound | Amount applied. Percentages by weight based on filament | Adhesion to rubber kg/cm² |
|---|---|---|---|
| 3 | N,N,N',N'-tetraglycidyl-p-phenylenediamine | 0.10 | 53.6 |
| 4 | Same as 3 | 0.05 | 51.2 |
| 5 | " | 0.005 | 11.9 |
| 6 | " | 0.20 | 47.7 |
| 7 | " | 1.35 | 45.7 |
| 8 | N,N-diglycidyl-p-aminophenol glycide ether | 0.11 | 47.6 |
| 9 | N,N,N',N'-tetraglycidyl-4,4'-diaminodiphenylmethane | 0.10 | 52.8 |
| 10 | N,N,N',N'-tetra-glycidyl-4,4'-diamino-diphenyl-2,2-propane | 0.12 | 49.6 |

EXAMPLE 11

The procedure is the same as in Example 3, but a filament of poly-p- and -m-phenylene-1,3,4-oxadiazole (ratio of para:meta = 5:1) with a total thickness of 1150 den. is employed. The treatment with the RFL dipping bath is omitted. The amount of N,N,N',N'-tetraglycidyl-p-phenylenediamine applied is 0.14 per cent by weight of filament. A value of 39.9 kg/cm² is found for the adhesion to rubber by the U test.

While only a limited number of embodiments have been expressly described, the invention is, nonetheless, to be broadly construed and not to be limited except by the character of the claims appended hereto.

What is claimed is:

1. A process for the improvement of adhesion to rubber of aromatic poly-1,3,4-oxadiazole filaments which process comprises applying to said filaments at least one adhesion agent taken from the class consisting of compounds having at least one N-glycidyl group, and fixing said agent on said filaments.

2. A process according to claim 1 wherein said agent comprises mono or poly N-glycidyl compounds of aliphatic or aromatic amines, imides or amides.

3. A process according to claim 1 wherein said agent comprises N,N diglycidyl compounds of aromatic amines.

4. A process according to claim 1 wherein said agent is taken from the class consisting of N,N-bis-glycidyl butylamine,
N,N-bis-glycidyl cyclohexylamine,
N,N,N',N'-tetraglycidyl tetramethylenediamine,
N,N,N',N'-tetraglycidyl hexamethylenediamine
N,N,N',N'-tetraglycidyl-3-ethylamino-3,5,5-trimethylcyclohexylamine,
N,N,N',N'-tetraglycidyl-(1,3-bis-aminomethyl)benzene,
N,N,N',N'-tetraglycidyl-(1,4-bis-aminomethyl)benzene,
N,N-bis-glycidyl-aniline,
N,N-bis-glycidyl toluidine,
N,N-bis-glycidyl-p-chloroaniline,
N,N,O-triglycidyl-m-aminophenol,
N,N,O-triglycidyl-p-aminophenol,
N,N,N',N'-tetraglycidyl-m-phenylenediamine,
N,N,N',N'-tetraglycidyl-p-phenylenediamine,
N,N,N',N'-tetraglycidyl-2,2-bis-(p-aminophenyl)-propane,
N,N,N',N'-tetraglycidyl-4,4'-diaminodiphenylmethane,
N,N,N',N'-tetraglycidyl benzidine,
N,N-bis-glycidylbenzoic acid amide,
N,N-bis-glycidyl benzenesulfonic acid amide,
N,N,N',N'-tetraglycidyl sulfanilic acid amide,
N,N,S-triglycidyl amino thiophenol,
N,N-bis-glycidyl acrylic acid amide,
N-glycidyl caprolactam,
N,N,N',N'-tetraglycidyl urea,
N,N,N',N'-tetraglycidyl thiourea,
N,N,N',N'-tetraglycidyl guanadine
N,N,N',N',N'',N''-hexaglycidyl melamine,
N,N,O-triglycidyl aminoethanol,
N,N,O-triglycidyl aminopropanol,
N,O,O'-triglycidyl diethanolamine,
N,N-bis-glycidyl aminoacetic acid glycide ester,
N,N-bis-glycidyl-p-aminobenzoic acid glycide ester.

5. A process according to claim 1 wherein said agent is N,N,N',N'-tetraglycidyl arylenediamine.

6. A process according to claim 1 wherein said agent is N,N,N',N'-tetraglycidyl-p-phenylenediamine.

7. A process according to claim 1 wherein said agent is N,N,N',N'-tetraglycidyl-4,4'diaminodiphenylmethane.

8. A process according to claim 1 wherein said agent is N,N,N',N'-tetraglycidyl-4,4'-diaminodiphenyl-2,2-propane.

9. A process according to claim 1 wherein said agent is N,N-diglycidyl-p-aminophenol glycide ether.

10. A process according to claim 1 wherein said adhesion agent is present in an amount of 0.001 to 10% by weight of said filaments.

11. A process according to claim 9 wherein said amount is 0.05 to 5% by weight of said filaments.

12. A process according to claim 1 wherein said filaments, after application of said agent, are contacted with a bath comprising resorcinol, formaldehyde, and latex.

13. A process according to claim 1 wherein said filaments are dried and thermally fixed after said agent is applied.

14. The product of the process of claim 1.

15. The product of the process of claim 4.

16. A method of reinforcing rubber articles comprising embedding the products of claim 14 in said rubber.

17. A method of reinforcing a tire carcass comprising embedding the products of claim 14 in said carcass.

* * * * *